US009032015B2

(12) United States Patent
Chang et al.

(10) Patent No.: US 9,032,015 B2
(45) Date of Patent: May 12, 2015

(54) DATA DISTRIBUTING AND ACCESSING METHOD AND SYSTEM

(75) Inventors: Meng-Chun Chang, Taipei (TW); Hung-Wen Yu, Taipei (TW)

(73) Assignee: Via Technologies, Inc., Taipei (TW)

( * ) Notice: Subject to any disclaimer, the term of this patent is extended or adjusted under 35 U.S.C. 154(b) by 2201 days.

(21) Appl. No.: 11/945,358

(22) Filed: Nov. 27, 2007

(65) Prior Publication Data

US 2008/0294646 A1 Nov. 27, 2008

(30) Foreign Application Priority Data

May 24, 2007 (TW) ............................... 96118600 A

(51) Int. Cl.
*G06F 15/16* (2006.01)
*G06F 17/30* (2006.01)
*H04N 1/44* (2006.01)

(52) U.S. Cl.
CPC ................................ *G06F 17/30212* (2013.01)

(58) Field of Classification Search
USPC .................. 709/200, 203, 205, 246; 380/286
See application file for complete search history.

(56) References Cited

U.S. PATENT DOCUMENTS 5,610,982 A * 3/1997 Micali ........................... 713/157
5,666,414 A * 9/1997 Micali ........................... 380/286
5,717,759 A * 2/1998 Micali ........................... 713/157
6,026,163 A * 2/2000 Micali ............................. 705/80
6,922,724 B1 7/2005 Freeman et al.
6,970,939 B2 11/2005 Sim
7,379,967 B2 * 5/2008 Izutsu et al. .................. 709/204
2002/0073086 A1 6/2002 Thompson et al.
2002/0112069 A1 8/2002 Sim
2003/0031176 A1 2/2003 Sim
2003/0099202 A1 5/2003 Lear et al.
2005/0132134 A1 6/2005 Chien
2007/0028133 A1 * 2/2007 Izutsu et al. ...................... 714/4
2009/0055547 A1 * 2/2009 Hudson et al. ................ 709/231
2010/0235432 A1 * 9/2010 Trojer .......................... 709/203

FOREIGN PATENT DOCUMENTS

TW I232376 B 5/2005

OTHER PUBLICATIONS

Bruce Bobier "BitTorrent's Transfer Optimizations", Oct. 12, 2005, http://svn.tribler.org/abc/branches/boudewijn/thesis/third_party/bobier_bst.pdf, whole article.*
Arun Chokkalingam & Firasath Riyaz "BitTorrent Protocol Specification", Dec. 12, 2004. http://cs.ecs.baylor.edu/~donahoo/ classes/5321/ projects/ bittorrent/ BitTorrent%20Protocol%20Specification.doc.*

* cited by examiner

*Primary Examiner* — Emmanuel L Moise
*Assistant Examiner* — Vitali Korobov
(74) *Attorney, Agent, or Firm* — Kirton McConkie; Evan R. Witt

(57) ABSTRACT

A data distributing and accessing method for sharing a file via a network system includes steps of: dividing the file into a plurality of blocks; distributing the blocks in a plurality of data hosts interconnected via the network system; one of the data hosts receiving a file-reading request from a user host and issuing collecting requests to other data hosts to collect the blocks from the data hosts; and transferring the collected blocks from the data hosts to the user host to be combined into the file.

11 Claims, 13 Drawing Sheets

| | | | |
|---|---|---|---|
| 1st data host | Block A | Block B | Block C |
| 2nd data host | Block D | Block A | Block B |
| 3rd data host | Block C | Block D | Block A |
| 4th data host | Block B | Block C | Block D |
| 5th data host | Block A | Block B | Block C |

FIG.7A

| | | | |
|---|---|---|---|
| 1st data host | Block A | Block B | Block C |
| | | Block A | Block B |
| 3rd data host | Block C | | Block A |
| 4th data host | Block B | Block C | |
| 5th data host | Block A | Block B | Block C |

FIG.7B

| | | | |
|---|---|---|---|
| | | Block B | Block C |
| | | | Block B |
| 3rd data host | Block C | | |
| 4th data host | Block B | Block C | |
| 5th data host | | Block B | Block C |

FIG.7C

| | | | |
|---|---|---|---|
| | | | Block C |
| | | | |
| 3rd data host | Block C | | |
| | | Block C | |
| 5th data host | | | Block C |

FIG.7D

| 1st data host | Block A | Block B | Block C | Block D |
|---|---|---|---|---|
| 2nd data host | Block E | Block A | Block B | Block C |
| 3rd data host | Block D | Block E | Block A | Block B |

FIG.8A

| | Block A | Block B | | Block D |
|---|---|---|---|---|
| 2nd data host | Block E | Block A | Block B | |
| 3rd data host | Block D | Block E | Block A | Block B |

FIG.8B

| | Block A | Block B | | |
|---|---|---|---|---|
| 2nd data host | Block E | Block A | Block B | |
| | | Block E | Block A | Block B |

FIG.8C

| | Block A | Block B | | |
|---|---|---|---|---|
| | | Block A | Block B | |
| | | | Block A | Block B |

FIG.8D

| 1st data host | Block A | Block B | | |
|---|---|---|---|---|
| 2nd data host | | Block A | Block B | |
| 3rd data host | | | Block A | Block B |

FIG.8E

| | | Block B | | |
|---|---|---|---|---|
| 2nd data host | | | Block B | |
| 3rd data host | | | | Block B |

FIG.8F

DATA DISTRIBUTING AND ACCESSING METHOD AND SYSTEM

FIELD OF THE INVENTION

The present invention relates to a method and a system for distributing and accessing data, and more particularly to a method and a system for distributing and accessing data shared via a network system.

BACKGROUND OF THE INVENTION

With the rapid development of technologies in networking and digital data storage, information and documents can be shared easily through a network system. For example, authorized research and development departments or institutes distributed all over the world may share and maintain their materials and efforts one another via the network system. FIG. 1 illustrates a network system including a data host 11 and a plurality of user hosts 12, 13, . . . , 1*n* interconnected via Internet 10. Documents 110 to be shared by the user hosts are stored in the data host 11 and accessible via Internet 10 to be acquired or updated.

As technological documents, unlike dictionaries, are generally complicated, it is hard to sort and index the contents of the technological documents simply by way of a text list or table of contents, and thus it is difficult for the users to search these contents efficiently. Aside from, if all the shared documents are stored in a single data host, it may suffer from limited transmission speed and risk losing data once the data host is damaged. Moreover, if the data host is unfortunately explored by a hacker, all the documents are likely to be stolen, which would be a serious problem for researchers.

SUMMARY OF THE INVENTION

Therefore, the present invention properly distributes the shared data in a recoverable manner so as to secure the data and make data-searching more efficiently.

The present invention provides a data distributing and accessing method for sharing a file via a network system. The method includes steps of: dividing the file into a plurality of blocks; distributing the blocks in a plurality of data hosts interconnected via the network system; one of the data hosts receiving a file-reading request from a user host and issuing collecting requests to other data hosts to collect the blocks from the data hosts; and transferring the collected blocks from the data hosts to the user host to be combined into the file.

The present invention also provides a data storing method for securing a file to be shared via a network system. The method includes steps of: dividing the file into a plurality of blocks; duplicating each of the blocks into a plurality of block copies; and distributing the block copies in a plurality of data hosts interconnected via the network system so that each of the data hosts contains more than one of the blocks while missing at least one of the blocks.

The present invention further provides a data storing system for storing a file to be shared via a network system, which includes the network system and a plurality of data hosts interconnected via the network system, each of which stores an incomplete portion of the file and at least two of which contain overlapping portions of the file.

BRIEF DESCRIPTION OF THE DRAWINGS

The above contents of the present invention will become more readily apparent to those ordinarily skilled in the art after reviewing the following detailed description and accompanying drawings, in which:

FIGS. 7A~7D are block distribution tables generated or updated in an example of the data accessing method of FIG. 6;

FIGS. 8A~8F are block distribution tables generated or updated in another example of the data accessing method of FIG. 6;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

For ameliorating the conventional data-sharing method to secure the data and make data-searching more efficiently, the present invention provides a data distributing and accessing method. For implementing the data distributing and accessing method, a system with which the shared data are associated is analyzed and resolved into a plurality of subsystems with different levels, and the relationship between each resolved part of the system and the shared data is defined.

Figure 1:
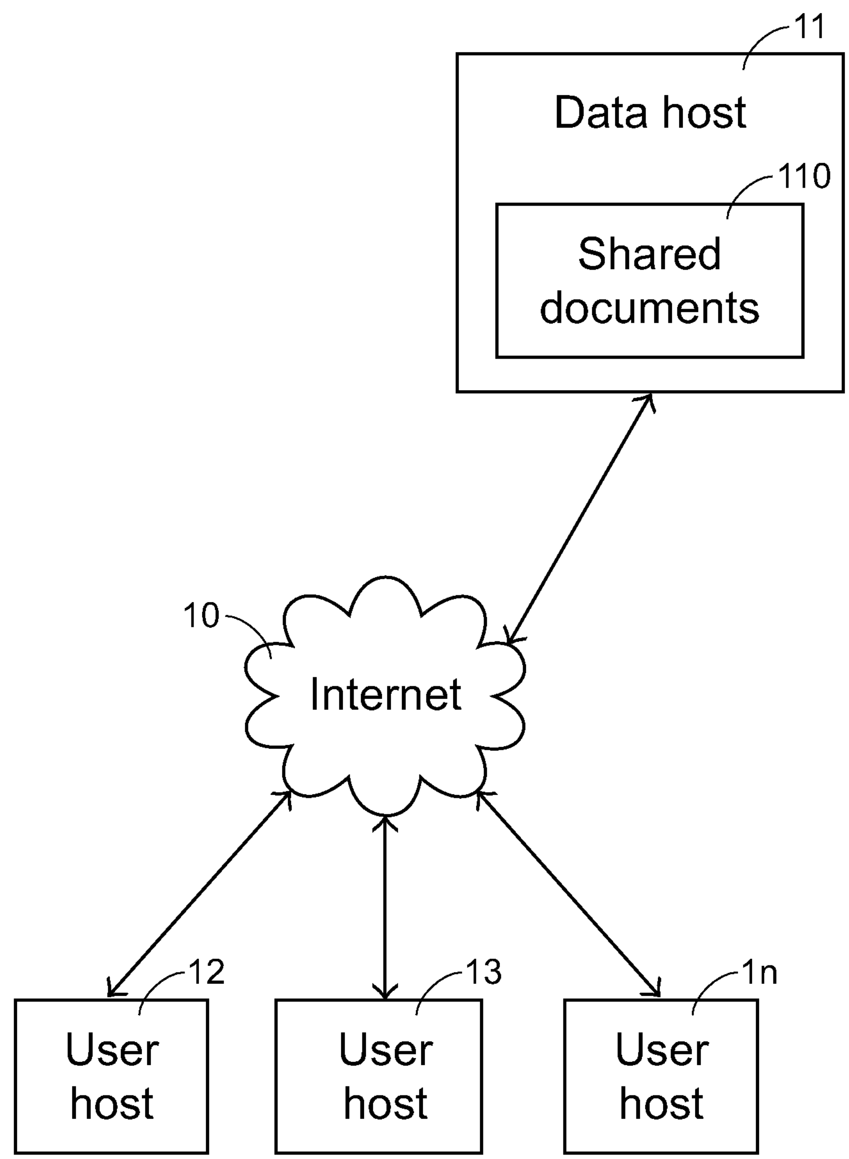
FIG. 1 is a schematic diagram illustrating a conventional data-sharing system.
Figure 2:
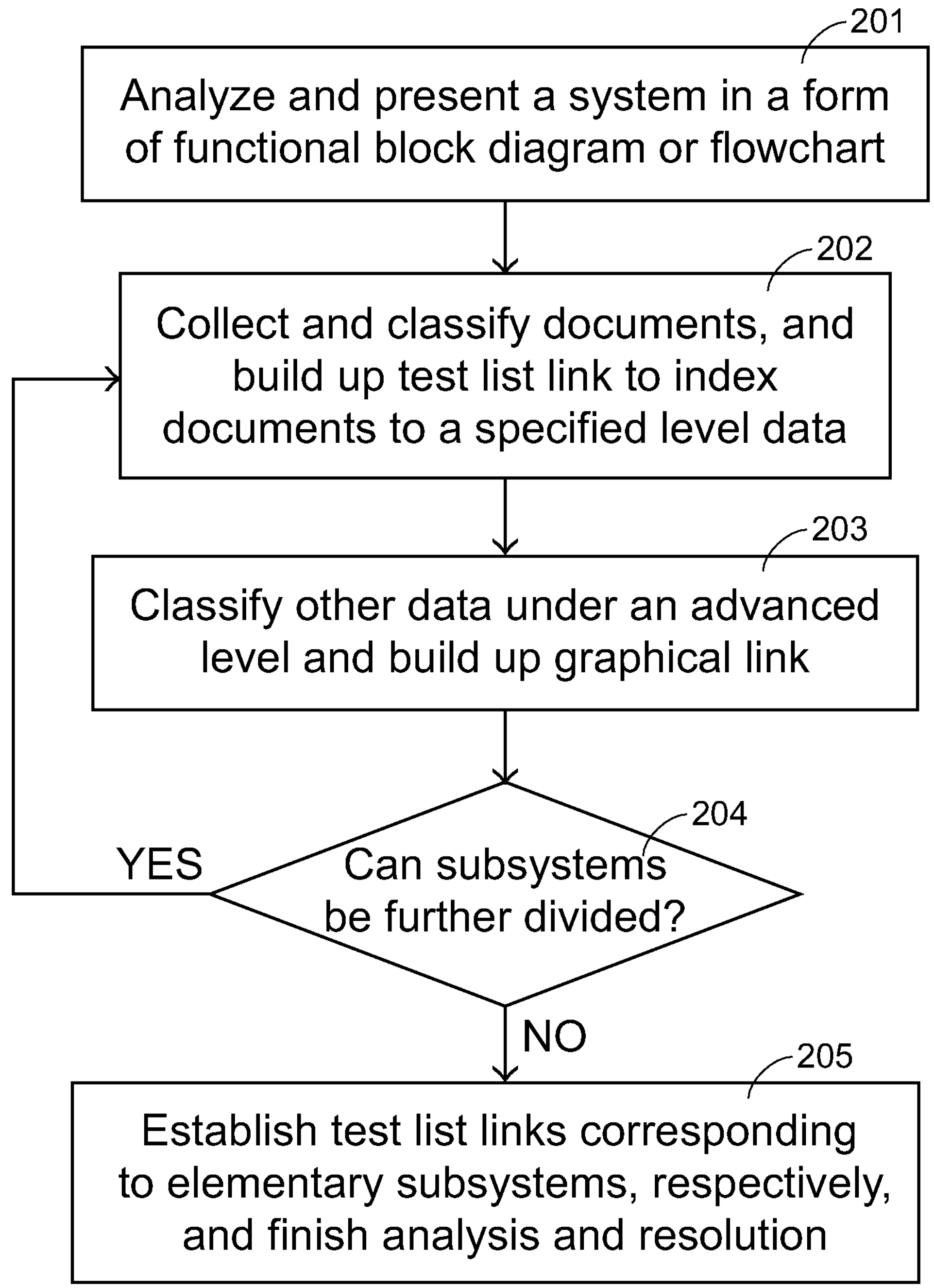
FIG. 2 is a flowchart showing an example of indexing documents to different system levels prior to executing a data distributing and accessing method of the present invention.
Figure 3:
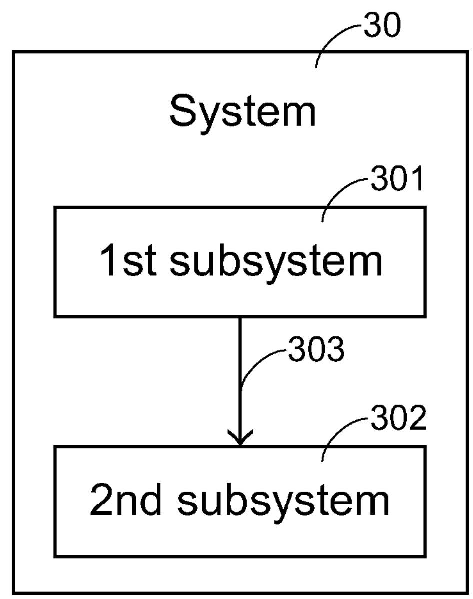
FIG. 3 is a block diagram schematically showing the resolution of a system into subsystems.

FIG. 2 illustrates how data indices are generated in the data distributing and accessing method for defining the relationship between the resolved parts of the system and the shared data. First of all, the system is analyzed and presented in a form of functional block diagram or flowchart (Step 201). The data to be shared, which are technological documents in this example, are first collected and classified into level-zero data and non-level-zero data, and a text list link is built up to index these documents to the level-zero data (Step 202). The other documents which do not belong to the level-zero data are further classified under Level One according to the resolved subsystems and the relationship between the resolved subsystems, and a graphical link is established (Step 203). The graphical link can also be a functional block diagram or a flowchart, which is exemplified in FIG. 3, wherein the system 30 includes a first subsystem 301 representing a resolved part of the system, a second subsystem 302 representing another resolved part of the system, and a third subsystem 303 representing the connection between the first subsystem 301 and the second subsystem 302. If the resulting subsystems, e.g. the subsystems 301, 302 and 303, have been basic elements unable to be further divided (Step 204), three text list links corresponding to the three subsystems, respectively, are established and the analysis and resolution are completed (Step 205). Otherwise, each of the subsystems is treated as a system to repeat Steps 202~204 so as to be analyzed and resolved to build up another text list link between the level-one data and associated documents and realize further sub-systems. With the text list links, authorized users may readily locate the desired documents.

Figure 4:
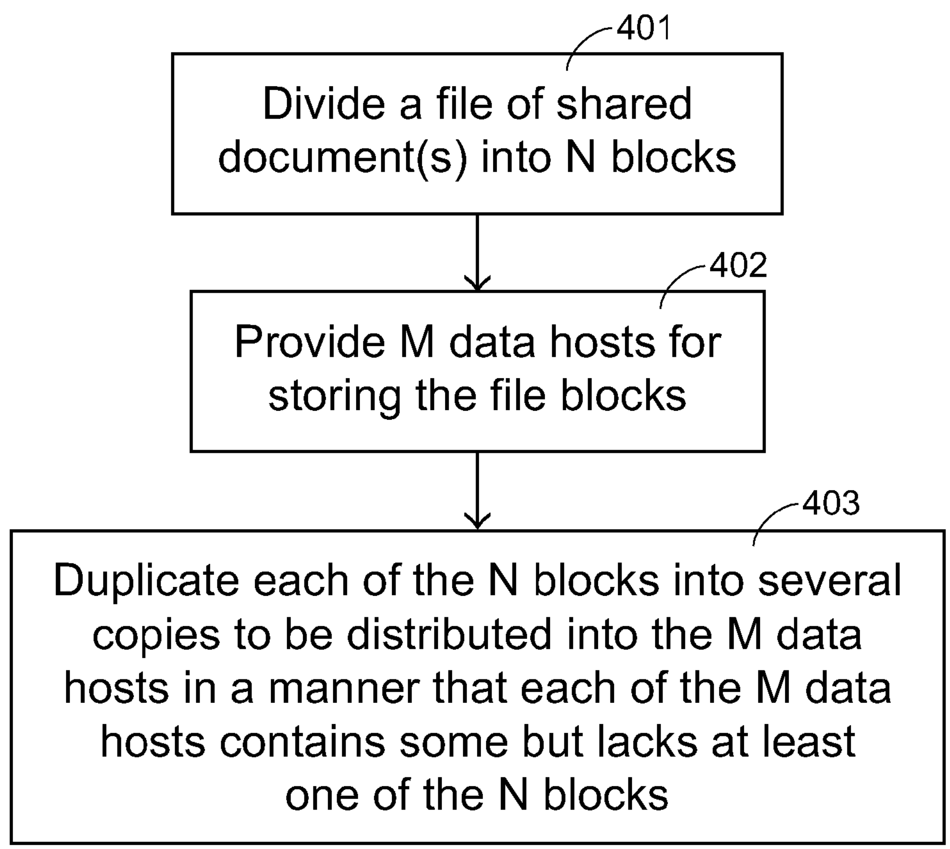
FIG. 4 is a flowchart of a data storing method according to an embodiment of the present invention.

Furthermore, each of the indexed documents is stored safely and accessible readily in a manner according to the present invention. That is, a file of one or more documents is divided into a plurality of blocks and distributed in a plurality of data hosts, and the blocks of the file are accessed from the data hosts and recombined when an authorized user needs to access the file. The plurality of data hosts may be disposed in different places or cities or even different countries and inter-connected via Internet or a local area network. An embodiment of the data distributing and accessing method according to the present invention is illustrated in FIG. 4.

Figure 5A:
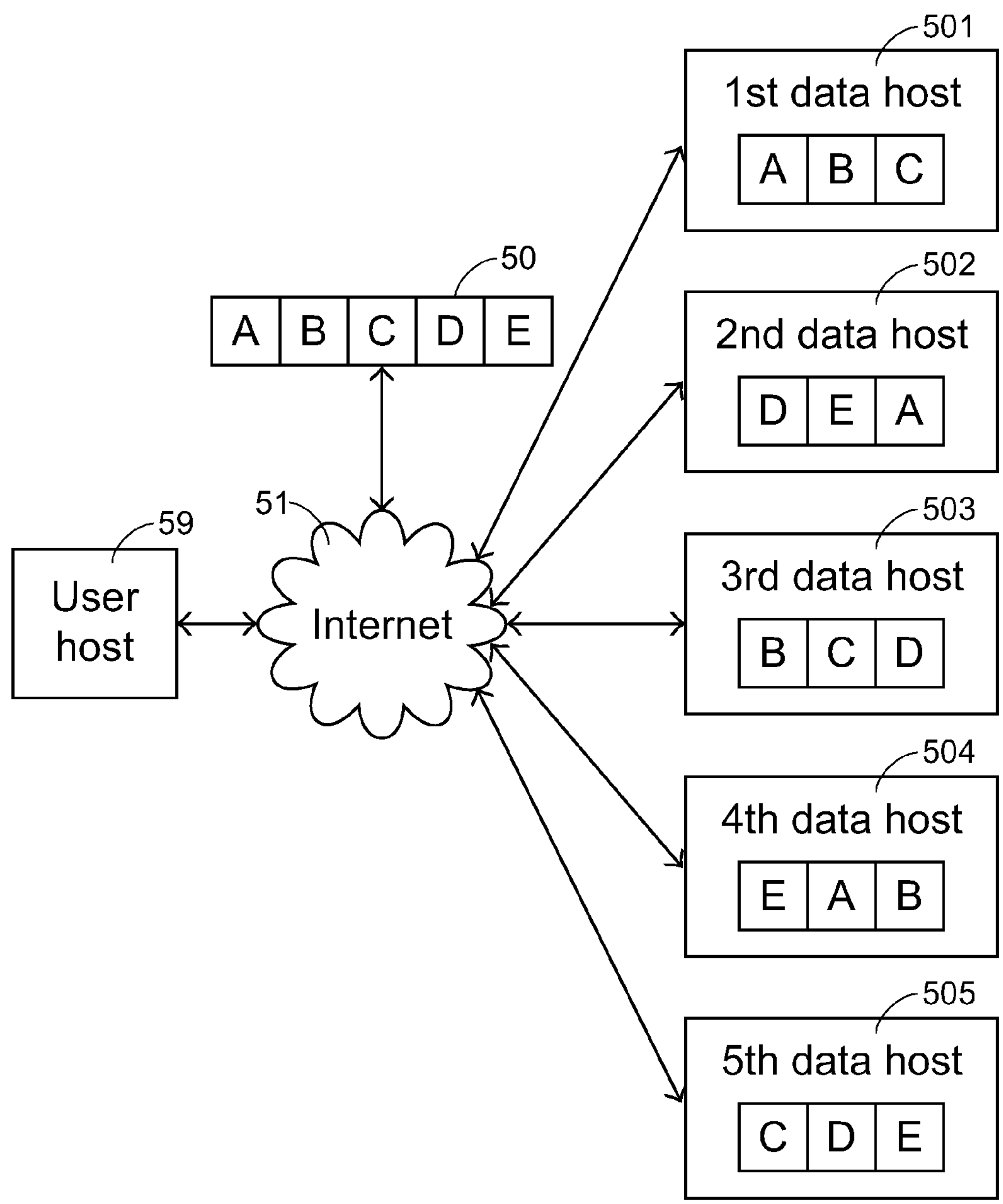
FIGS. 5A~5C are schematic diagrams illustrating three examples of data-sharing systems, wherein the shared data are distributed according to the method of FIG. 4.
Figure 5B:
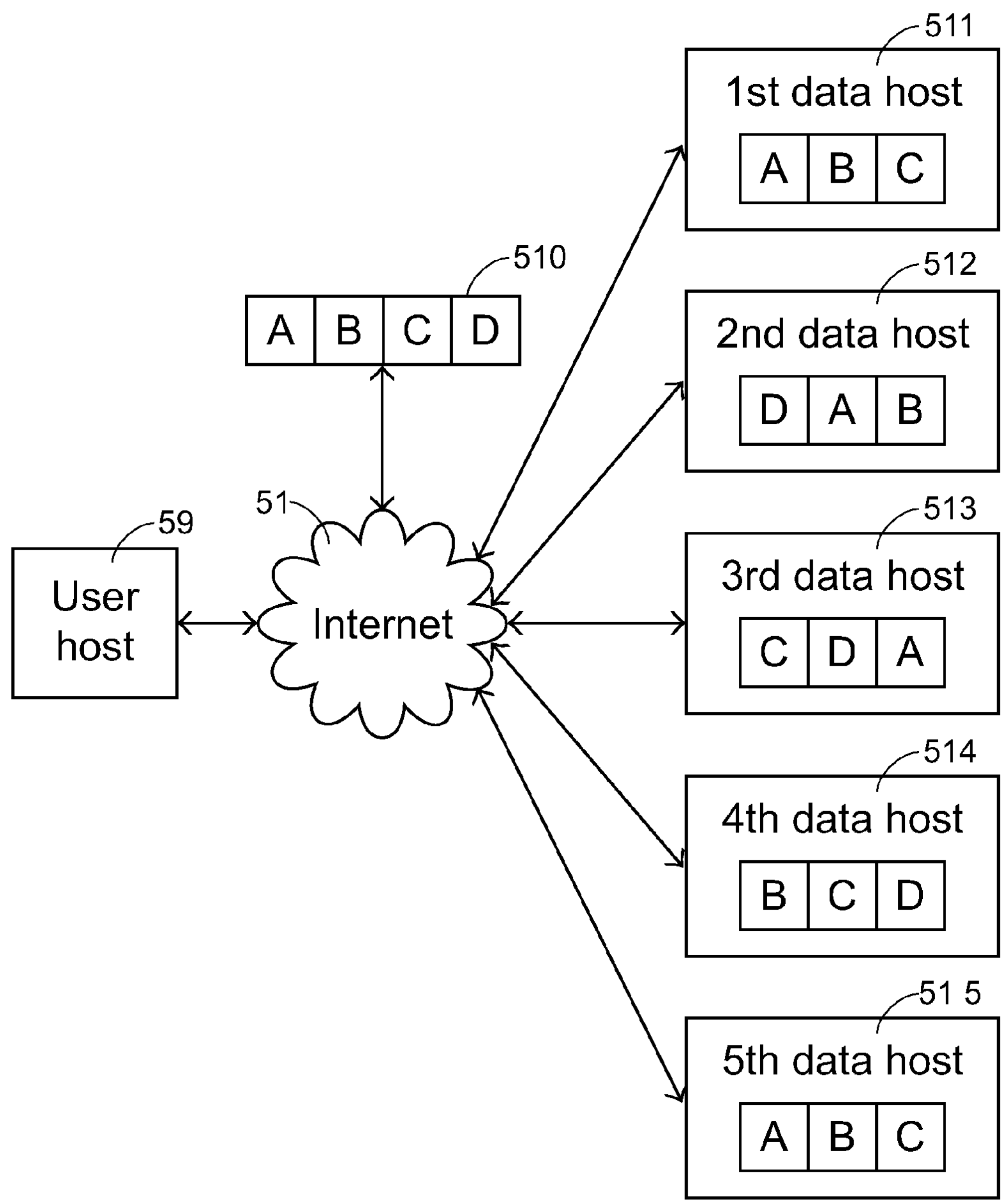
Figure 5C:
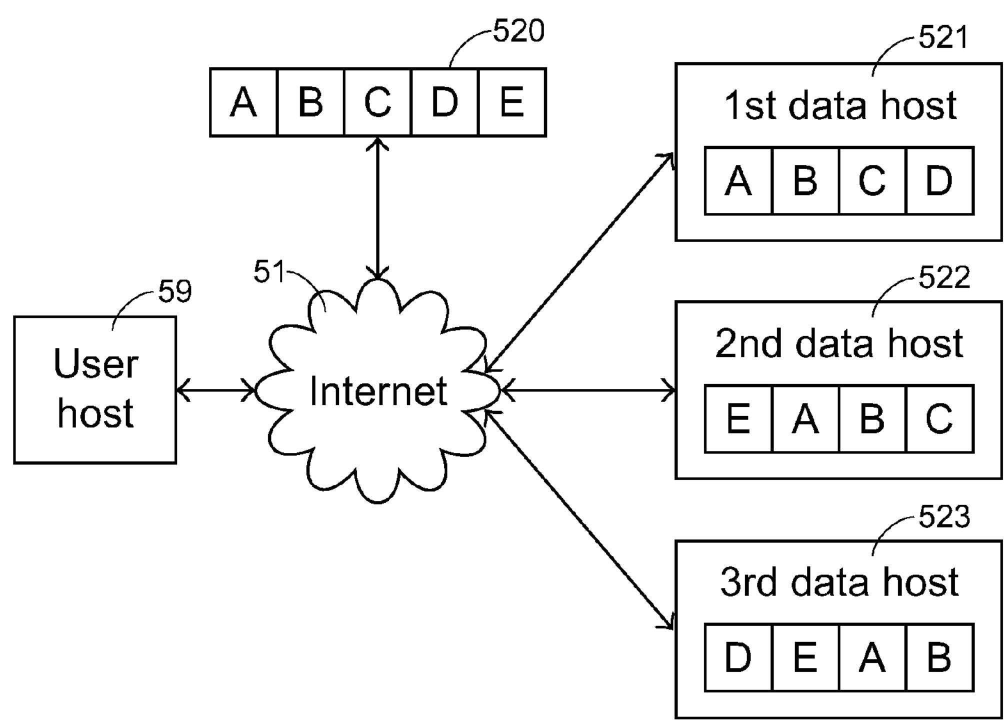
Figure 6:
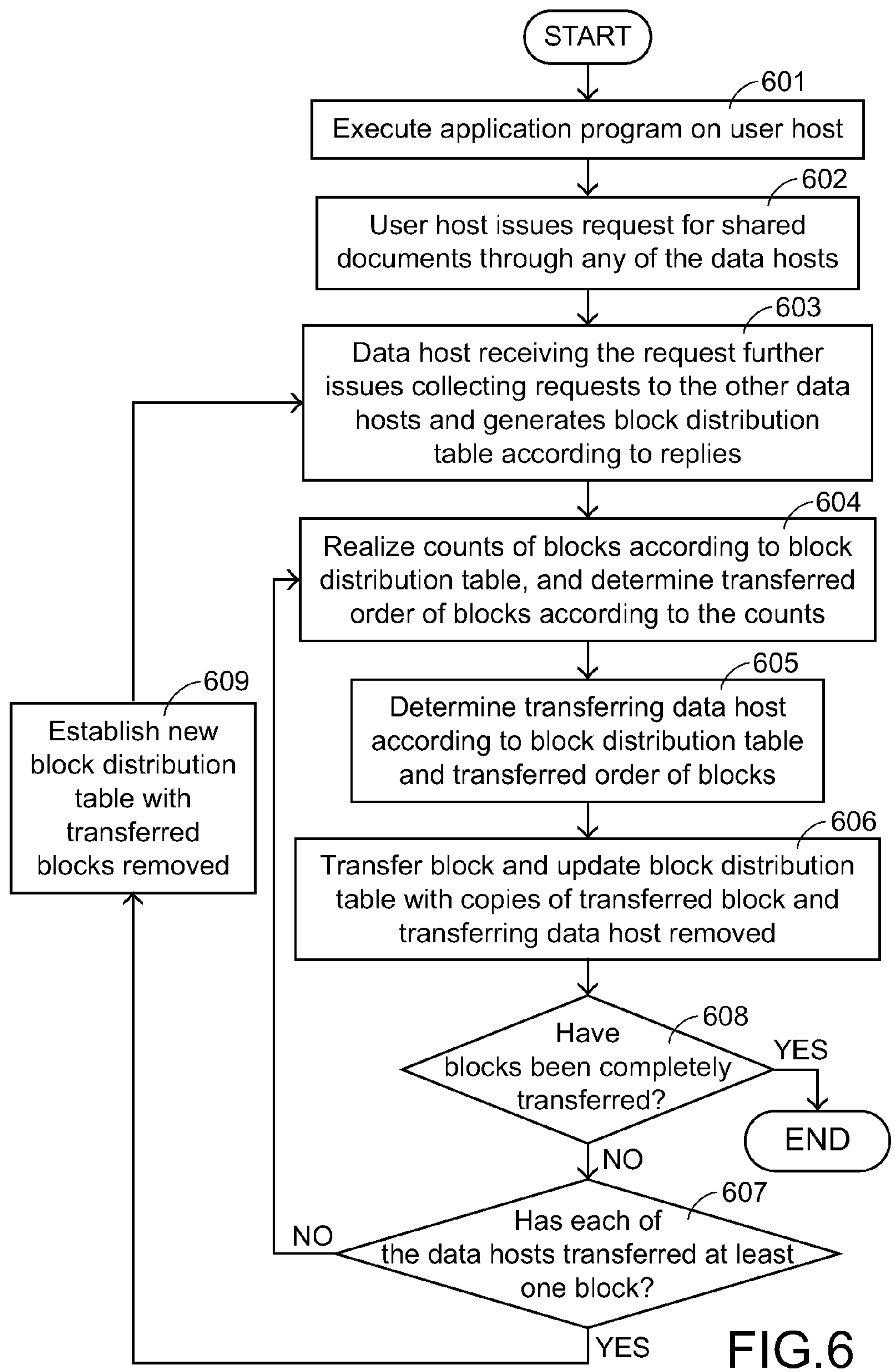
FIG. 6 is a flowchart of a data accessing method according to an embodiment of the present invention.

In Step 401, a file of shared document(s) is divided into N blocks. Then, M data hosts are provided for storing the file blocks (Step 402). Each of the N blocks is duplicated into several copies to be distributed into the M data hosts in a manner that each of the M data hosts contains some but lacks at least one of the N blocks (Step 403). The number N of the blocks can be larger or smaller than or equal to the number M of the data hosts. It is to be noted, however, that none of the M data hosts should store therein all the N blocks in view of the hackers' damage. FIGS. 5A, 5B and 5C illustrate three examples for distributing file blocks, wherein M=5 and N=5 in the example of FIG. 5A, M=5 and N=4 in the example of FIGS. 5B and M=3 and N=5 in the example of FIG. 5C.

Refer to FIG. 5A. Each of the five data hosts 501~505 contain three of the five blocks A~E of the file 50. For example, the first three blocks A, B and C are first distributed to the first data host 501. Then next distribution starts with the remaining two blocks D and E. Therefore, the second data host 502 contains blocks D, E and A. In a similar manner, blocks B, C and D are distributed to the third data host 503, blocks E, A and B are distributed to the fourth data host 504, and blocks A, B and C are distributed to the fifth data host 505. An authorized user may use a user host 59 to access the blocks from the data hosts via Internet 51, and combine the blocks to recover the complete file. It is to be noted that the distribution order of blocks can be changed depending on designs. In the example of FIG. 5B, each of the five data hosts 511~515 contain three of the four blocks A~D of the file 510. In the example of FIG. 5C, each of the three data hosts 521~523 contain four of the five blocks A~E of the file 520.

When an authorized user needs to read the file from the data hosts, the user first executes an application program on his user host (Step 601). In response, the user host issues a request for shared documents through any of the data hosts (Step 602). The data host receiving the request verifies the request first to see whether the user host is an authorized user or not. If not, the request will be rejected. If the user host passes the verification, the data host receiving the request further issues collecting requests to the other data hosts and generates a block distribution table according to the replies from the other data hosts (Step 603). From the block distribution table, respective counts of all kinds of blocks are realized, which are referred to so as to determine the transferred order of the blocks (Step 604). In this example, the block having a less count has a higher priority to be transferred. The order, of course, can be designated in other ways depending on designs. Then the file blocks are transferred from the data hosts in an order determined according to the block distribution table and the transferred order of the blocks (Step 605). Meanwhile, the block distribution table is updated to remove the transferred block and the associated data host (Step 606). The block transfer cycle including Step 604~606 are repeated until all the blocks required for recovering the file have been acquired (Step 607). However, if each of the data hosts has transferred the file blocks once before the blocks required for recovering the file are completely acquired (Step 608), establish a new block distribution table with transferred blocks removed from the table (Step 609), and repeat Steps 603 to 609 until all required blocks are completely transferred.

An example is described herein with reference to block distribution tables of FIGS. 7A~7E, wherein the first data host is the selected one to collect blocks and establish the block distribution table, and there are four file blocks distributed to five data hosts as shown in the scheme of FIG. 5B and the table of FIG. 7A. From the block distribution table, the counts of Blocks A, B, C and D are 4, 4, 4 and 3, respectively. Therefore, Block D has the highest priority to be transferred. Since the first, second and third data hosts all contain Block D, the first data host selects one of the first, second and third data hosts, e.g. the second one, to transfer Block D. As a result, the block distribution table is updated as shown in FIG. 7B, wherein Block D and the second data host are removed from the table. Subsequently, since Block A, B and C have the same counts, one of them, e.g. Block A, is selected for next transfer. Since the first, third, fourth and fifth data hosts in the updated table all contain Block A, the first data host selects one of the first, third, fourth and fifth data hosts, e.g. the first one, to transfer Block A. As a result, the block distribution table is updated again as shown in FIG. 7C, wherein Block A and the first data host are removed from the table. Likewise, the block distribution table is updated again as shown in FIG. 7D after the fourth data host transfers Block B. Finally, after the third data host transfers Block C, the transfer of all blocks of the file is completed.

Another example is described herein with reference to block distribution tables of FIGS. 8A~8F, wherein the first data host is the selected one to collect blocks and establish the block distribution table, and there are five file blocks distributed to three data hosts as shown in the scheme of FIG. 5C and the table of FIG. 8A. From the block distribution table, the counts of Blocks A, B, C, D and E are 3, 3, 2, 2 and 2, respectively. Therefore, Block C, Block D and Block E all have the highest priority to be transferred, and Block C is selected to be transferred first in this example. Since the first and second data hosts both contain Block C, the first data host selects one of the first and second data hosts, e.g. the first one, to transfer Block C. As a result, the block distribution table is updated as shown in FIG. 8B, wherein Block C and the first data host are removed from the table. Subsequently, Block D is selected for next transfer. The third data host transfers Block D, and thus the block distribution table is updated again as shown in FIG. 8C, wherein Block D and the third data host are removed from the table. Likewise, the block distribution table is updated again as shown in FIG. 8D after the second data host transfers Block E. Since all the data hosts have transferred blocks once but the file is still incomplete, a new block distribution table as shown in FIG. 8E is established, in which the transferred blocks C, D and E are eliminated from the table. After the first data host transfers Block A (FIG. 8F) and the second data host transfers Block B to the user host issuing the request, the file can be completely recovered.

In the above embodiments and examples, a file is divided into a plurality of blocks. The division of file can be performed in a variety of manners. Hereinafter, some examples are given and shown in FIGS. 9A~9E and FIG. 10, in which identically shaded bits or bytes belong to the same file blocks while differentially shaded bits or bytes indicate different blocks. Generally, the more dispersive the file is, the better security the file has.

Figure 9A:
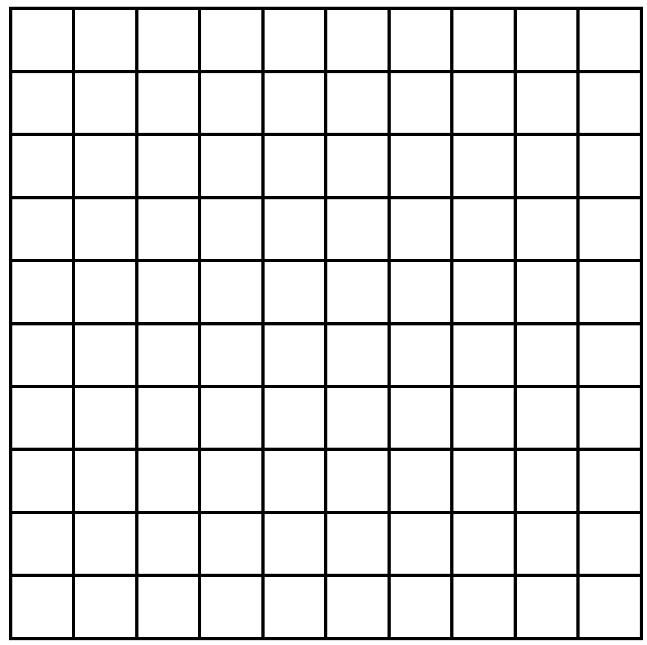
FIG. 9A is a schematic diagram illustrating an example of a file composition.
Figure 9B:
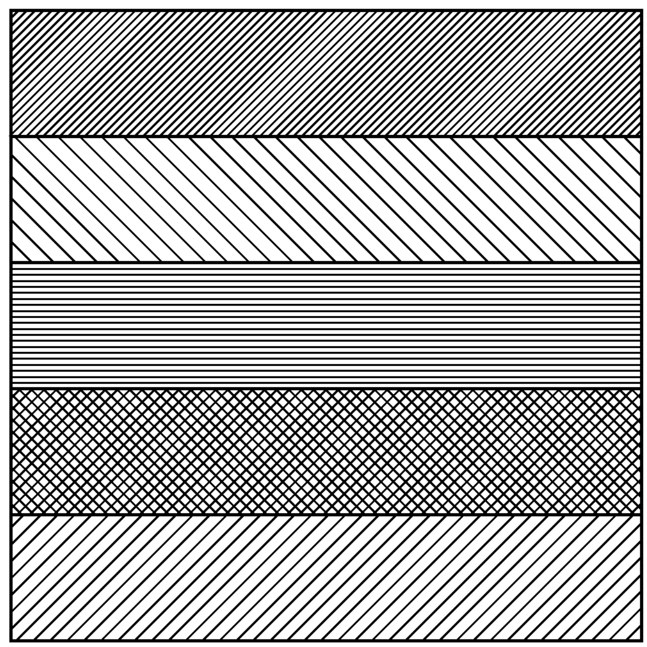
FIGS. 9B~9E are schematic diagrams illustrating examples of blocks divided from the file composition of FIG. 9A according to the present invention.
Figure 9C:
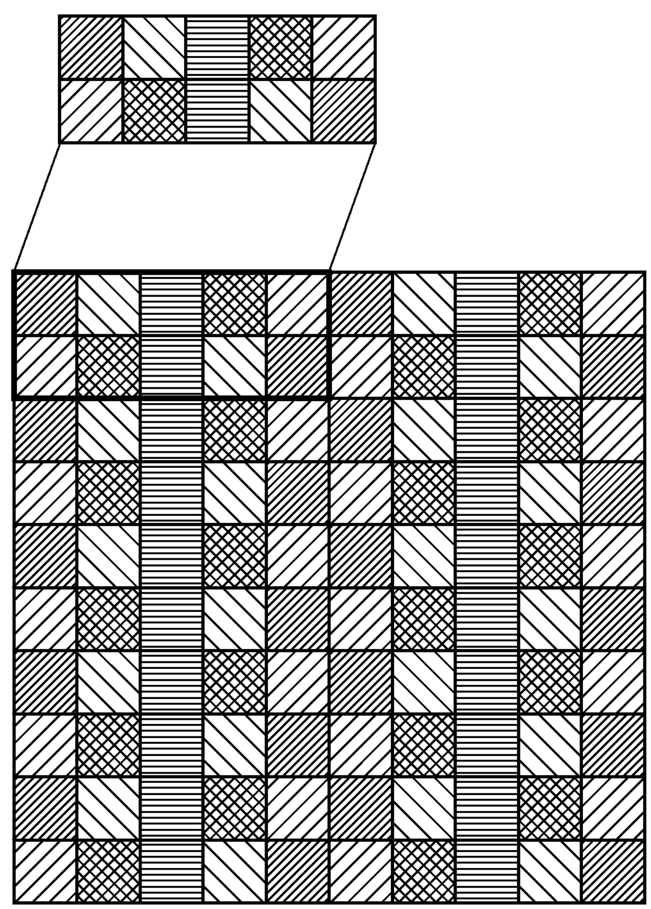
Figure 9D:
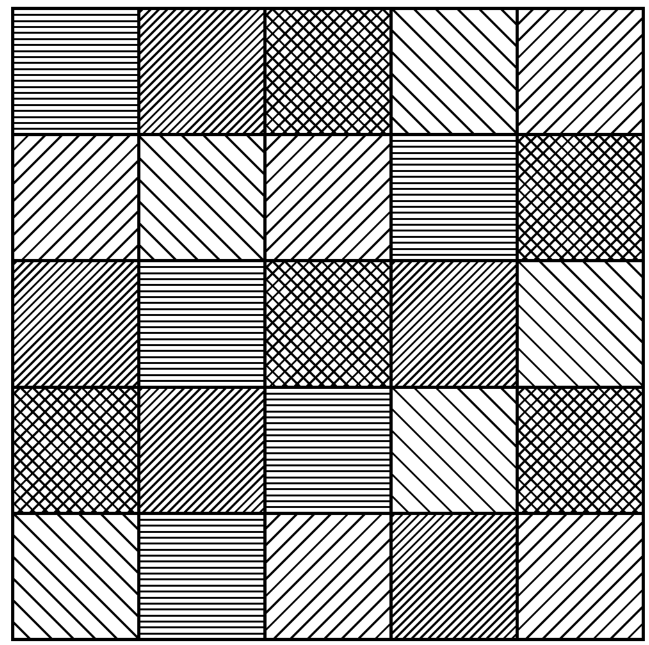
Figure 9E:
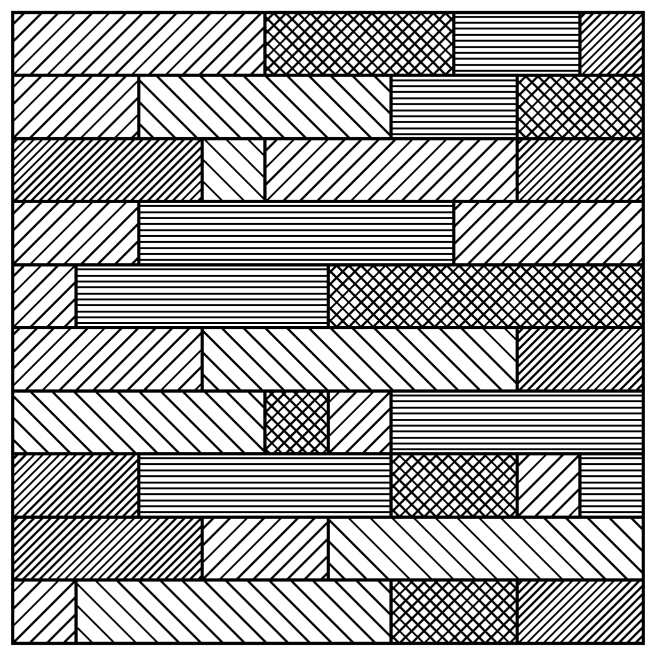

Assume that a file consisting of 100 data bytes and arranged as a 10×10 matrix is to be divided into 5 blocks, as shown in FIG. 9A. FIG. 9B illustrates an example that every two adjacent rows are allocated to the same blocks. FIG. 9C illustrates an example that the matrix is first divided into 10 small 2×5 matrixes. In each small matrix, the ten data bytes are further dispersed to be dealt out to the five blocks. In the example of FIG. 9D, the matrix is divided into 25 small 2×2 matrixes. The small matrixes are randomly but evenly distributed to the five blocks. In the example of FIG. 9E, the data bytes are randomly picked with random lengths, but still divided into five blocks.

Figure 10:
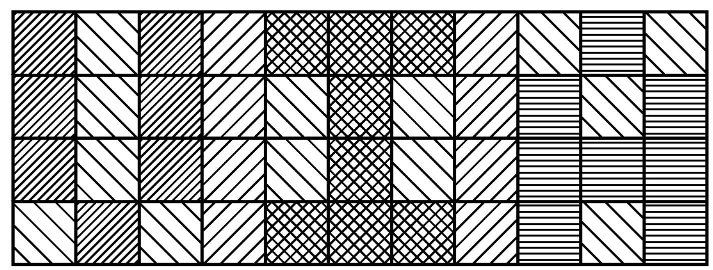
FIG. 10 is a schematic diagram illustrating an example of a dividing pattern of a file according to the present invention.

Alternatively, data bytes of a file can be divided into meaningful patterns. For example, a 4×11 matrix as shown in FIG. 10 are divided to show the word "VIA".

In view of the foregoing, it is understood that by analyzing and resolving a system into plural levels of elementary subsystems and indexing respective documents to the system levels, the searching of the documents can be made easy and fast. By providing a plurality of data hosts to store the shared file, the file is safe from damage of a single data host. Moreover, by dividing the file into blocks, duplicating the blocks and intentionally missing at least one of the blocks in each of the data hosts, none of the data host stores the complete file so as to protect the file from hackers.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data distributing and accessing method for sharing a file via a network system, comprising steps of:

dividing the file into a plurality of blocks;

duplicating each of the blocks into a plurality of block copies;

distributing the block copies in a plurality of data hosts interconnected via the network system, and each of the data hosts containing the copies of more than one of the blocks while missing the copy of at least one of the blocks;

one of the data hosts receiving a file-reading request from a user host and issuing collecting requests to other data hosts to collect block copies covering each of the blocks from the data hosts; and transferring the collected block copies from the data hosts to the user host to be combined into the file.

2. The method according to claim 1 further comprising a step of generating a block distribution table by the data host receiving the file-reading request to indicate the distribution of the collected block copies in the data hosts, wherein the collected block copies are transferred according to the block distribution table in the transferring step.

3. The method according to claim 2 wherein in the transferring step, one of the collected block copies corresponding to the block duplicated with a lower count of block copies is transferred prior to another one of the collected block copies corresponding to the block duplicated with a higher count of block copies.

4. The method according to claim 3 wherein the transferring step is performed more than one cycle when a number of the blocks is greater than a number of the data hosts, and each of the data hosts transfers up to one block copy in each cycle.

5. The method according to claim 4 wherein the block distribution table is updated to remove the block copy or copies corresponding to the same block that the transferred block copy corresponds to and the data host having transferred the block copy.

6. The method according to claim 5 wherein a new block distribution table is established in a new cycle to show the distribution of block copies which have not been transferred in the data hosts when there is at least one block copy left at the end of a preceding cycle.

7. The method according to claim 1 wherein in the dividing step, the divided blocks have the same size.

8. The method according to claim 1 wherein in the dividing step, the divided blocks have different sizes.

9. The method according to claim 1 wherein in the dividing step, the file is divided into the blocks according to a regular rule.

10. The method according to claim 1 wherein in the dividing step, the file is divided into the blocks randomly.

11. The method according to claim 1 further comprising a verifying step of the file-reading request, and the collecting step is not executed until the file-reading request passes verification in the verifying step.

* * * * *